United States Patent [19]

Wright

[11] Patent Number: 5,550,569
[45] Date of Patent: Aug. 27, 1996

[54] IMAGE PROCESSING FOR INK-JET PRINTING WITH FAST-AND SLOW-DRYING INKS

[75] Inventor: Joseph D. Wright, Burlington, Canada

[73] Assignee: Xerox Corporation, Stamford, Conn.

[21] Appl. No.: 226,582

[22] Filed: Apr. 12, 1994

[51] Int. Cl.$^6$ ............................... B41J 2/205; B41J 2/21
[52] U.S. Cl. ................................. 347/15; 347/43
[58] Field of Search ..................... 347/43, 15; 358/518

[56] References Cited

U.S. PATENT DOCUMENTS

| | | | |
|---|---|---|---|
| 4,194,221 | 3/1980 | Stoffel | 358/283 |
| 4,463,359 | 7/1984 | Ayata et al. | 346/1.1 |
| 4,521,805 | 6/1985 | Ayata et al. | 358/75 |
| 4,811,115 | 3/1989 | Lin et al. | 358/283 |
| 4,878,126 | 10/1989 | Ichikawa | 358/451 |
| 4,897,803 | 1/1990 | Calarco et al. | 364/518 |
| 5,225,911 | 7/1993 | Buckley et al. | 358/296 |
| 5,371,531 | 12/1994 | Rezanka et al. | 347/43 |
| 5,428,377 | 6/1995 | Stoffel et al. | 347/15 |

OTHER PUBLICATIONS

Co-pending Patent application No. 07/975,027 filed: Nov. 12, 1992 "Thermal Ink-Jet Printing with Fast-and Slow-drying Inks." Co-pending Patent application No. 08/004,479 entitled "Improved Automatic Image Segmentation".

Primary Examiner—Benjamin R. Fuller
Assistant Examiner—Thinh Nguyen
Attorney, Agent, or Firm—R. Hutter

[57] ABSTRACT

A desired image based on digital data is printed on a substrate. A subset of the digital data relating to a portion of the desired image is identified, wherein pixels associated with the digital data are of a predetermined spatial relationship with pixels intended to be of a different color as the pixels associated with the digital data. The subset of digital data is caused to activate a printhead adapted to emit ink of a first type. Data not of the subset of digital data is caused to activate a printhead adapted to emit ink of a second type, the ink of the first type being adapted to dry at a faster rate than the ink of the second type.

11 Claims, 8 Drawing Sheets

```
                       SHIFT
                  ┌──────────────────►
                  │ 0 1 2 3 4 5 6 7 8 9 10
                  │ 2 0 0 0 1 1 0 0 0 1 1
                  │ 0 0 0 0 0 0 0 0 0 0 0
                  │ 2 0 0 0 0 1 0 0 0 0 0
                  │ 1 0 0 1 0 0 0 0 0 1 0
                  │ 2 0 0 0 1 0 0 0 0 0 0
       SCAN LINE  │ 1 0 0 0 0 1 0 0 0 0 1
                  │ 0 0 0 0 0 0 0 0 0 0 0
                  │ 3 0 0 0 1 2 0 0 0 2 0
                  │ 0 0 0 0 0 0 0 0 0 0 0
                  │ 3 0 0 0 0 2 0 0 0 0 1
                  │ 0 0 0 0 0 0 0 0 0 0 0
                  │ 1 0 0 0 0 0 0 0 0 0 0
                  │ 2 0 0 0 0 2 0 0 0 0 1
                  │ 0 0 0 0 0 0 0 0 0 0 0
                  │ 4 0 0 0 1 2 0 0 0 1 1
                  ▼ 0 0 0 0 0 0 0 0 0 0 0
```

FIG. 7C

FIG. 8B

IMAGE PROCESSING FOR INK-JET PRINTING WITH FAST- AND SLOW-DRYING INKS

This application incorporates by reference co-pending U.S. patent applications Ser. No. 07/975,027, entitled "Thermal Ink-Jet Printing with Fast- and Slow-Drying Inks," and Ser. No. 08/004,479, entitled "Improved Automatic Image Segmentation", both assigned to the assignee hereof. Also incorporated by reference is U.S. Pat. No. 4,811,115, entitled "Image Processing Apparatus Using Approximate Auto Correlation Function to Detect the Frequency of Half-Tone Image Data," assigned to the assignee hereof.

The present invention relates to ink-jet printing, and is more particularly concerned with color printing using a combination of slow- and fast-drying inks to produce high quality images without intercolor bleeding.

In existing thermal ink jet printing, the printhead typically comprises one or more ink ejectors, such as disclosed in U.S. Pat. No. 4,463,359, each ejector including a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a print sheet, such as a piece of paper. Because the droplet of ink is emitted only when the resistor is actuated, this type of thermal ink-jet printing is known as "drop-on-demand" printing. Other types of ink-jet printing, such as piezoelectric, continuous-stream, or acoustic, are also known, and are also applicable to the present invention.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swaths, much like a typewriter; alternatively, a printhead which consists of an array of ejectors and extends the full width of the print sheet may be passed once down the print sheet to give full-page images, in what is known as a "full-width array" (FWA) printer. When the printhead and the print sheet are moved relative to each other, imagewise digital data is used to selectively activate the thermal energy generators in the printhead over time so that the desired image will be created on the print sheet.

With ink-jet printing, it is also possible to create multicolor images on a print sheet. This type of printing may be used for full-color images, such as to reproduce a color photograph, or can be employed for "highlight" color, in which colored additions are made to a main portion of the image or text, which is typically black. In either case, the most common technique for color ink jet printing has been to sequentially image two or more colors, in separate printing steps, onto the single print sheet. This superimposition can be carried out in any number of ways. To take the example of a full-width apparatus printing black and one highlight color, an apparatus may print out the entire black portion of the desired highlight image on the sheet, and then recirculate the print sheet once again to image the highlight color portion of the image onto the same sheet from another printhead loaded with the colored ink; such a system has a serious disadvantage in the production of accurate registration of the composed images. Alternately, two printheads may be positioned very close to each other, and render the two portions of the image onto the print sheet almost simultaneously, although two different areas of the print sheet will be printed upon by the different printheads at the same time or with a small time lag. For a full-color process image, four types of ink (yellow, magenta, cyan, and black) are emitted from four separate printheads during printing as the print sheet is moved relative to them. Contouring of four-color images, e.g. for the reproduction of color photographs, are typically created by "superpixeling" or "dot-next-to-dot" (DND) techniques, in which each pixel of the image is created from three or more partially-overlapping spots of different colors, as described, for example, in U.S. Pat. No. 4,999,646.

In any ink-jet printing apparatus, but particularly in color-printing applications, a key concern is the rapid and efficient drying of the ink which has been placed on the print sheet by the printheads. If wet ink is allowed to remain on the print sheet for an appreciable length of time, the image is likely to smear as the print sheet continues on its path through the apparatus. In color ink jet printing situations, another important problem related to ink drying is known as "intercolor bleed." This is a bleeding of one color portion of the image into another portion of the neighboring image of different color. This becomes most apparent when black image is imaged immediately adjacent to an area printed with a color such as cyan, magenta, or yellow. In such a case, the black ink will be seen to bleed into the color area (e.g., cyan, magenta, and yellow) to create a conspicuous print defect. If a composite color is made in the color area (e.g. by combining cyan and magenta to make a shade of blue), the problem will be particularly acute because of the large amount of liquid on the sheet surface. The lighter colored ink will bleed into the black portions of the image as well, but bleeding in this direction will not be as noticeable.

To avoid the print defects caused by inefficient drying of ink on the substrate and intercolor bleed, one solution is to employ either "quick penetrating" inks or special printing techniques. The quick penetrating inks have rapid drying properties, and penetrate deeply into the paper fibers soon after their ejections onto the print sheet. It is intended that, in the color context, the ink of one color will have dried before the imaging of the next color in the printing process, which may mean that the ink will be expected to dry within a small fraction of a second. Another problem with quick-penetrating inks in plain paper printing is known as "feathering," in which the ink is absorbed into the paper so quickly that traces of the ink appear to "feather out" around the areas on the print sheet where the ink was intended to be placed. This print defect may be tolerable in certain full-color images, but is certainly unacceptable in the printing of high quality text.

Co-pending U.S. patent application No. 07/975,027, filed Nov. 12, 1992, and entitled "Thermal Ink-Jet Printing With Fast- and Slow-Drying Inks," discloses an ink-jet printing apparatus in which the problems of bleeding or feathering are avoided by providing two black inks. A slow-drying black ink is used in some portions of the image and a relatively fast-drying black ink is used for other portions of the image. Basically, the slow-drying black ink is used where the black portion of the image does not abut areas printed with other colors of the sheet, such as in the text of a document. The fast-drying black ink is used in situations where the black ink is placed in close proximity to inks of other colors on the sheet, particularly in reproducing a color image or photograph. In a preferred embodiment of the invention, the slow-drying black ink is first placed by itself on the sheet, and then immediately thereafter heat is applied to the sheet to dry the relatively slow-drying ink. Only after the slow-drying ink has substantially dried on the sheet is the fast-drying black ink, along with the other comparably fast-drying colored inks, placed on the sheet. In this way, a compromise is effected, using a slow-drying, non-feathering black ink in text, where such feathering would be conspicuous, and then using the fast-drying black ink in situations where intercolor bleed with other abutting colors would be of concern.

If it is desired to use such a two-black-ink ink-jet printing device, a practical problem arises if such an apparatus is connected to image processing equipment of existing designs. Any standard full-color imaging system, such as would be used, for example, with a xerographic color printing apparatus, will include four channels for the transference of image data, one channel for each primary color and black. If an image to be printed is displayed on a screen, there would be no need to discriminate between the black in text and the black in a part of a color image. A versatile system for printing full-color images (which typically include black text) should permit a "plug and play" relationship with the printing devices therein, be those devices xerographic or ink-jet. For this reason, it is desirable to provide an ink-jet printing apparatus which can simply accept the four-color data "as is" from an image-processing system, and then use that raw data to print the best possible image given the specific design of the printing apparatus. There is therefore provided, according to one embodiment of the present invention, an ink-jet color printing apparatus exploiting the advantages of using the fast- and slow-drying black ink design, but which is able to accept the simple four-color data which could be used by any apparatus. The printing apparatus itself is intended to analyze the data associated with the black portion of an image, and apportion the data as needed between printing with the slow-drying black ink and the fast-drying black ink, within the printing apparatus itself. Because the black portion of the image is analyzed within the "black box" of the printing apparatus, the data coming in to the printing apparatus need not be prepared or processed in any unusual way to make it specifically suitable to the two-black-ink printing system.

In the prior art, there are shown numerous systems for analyzing a pixel stream coming into a printer to optimize printer behavior for different types of image data. U.S. Pat. No. 4,194,221 discloses an image data handling system to segregate from a stream of image pixels high frequency halftone image input, continuous tone image input, low frequency halftone image input, and line image input. The image pixels are autocorrelated with an algorithm, descreened and then rescreened, and then analyzed for the presence of continuous tone image data.

U.S. Pat. No. 4,521,805 discloses a color ink-jet copier with two independent recording heads, one for printing in black ink, and the other for printing in colored inks. The printheads can be controlled to print out a hard copy of a given size, coloration, and/or quality with an optimized time efficiency.

U.S. Pat. No. 4,811,115 discloses improved algorithms for determining the presence of high frequency halftone data in a pixel stream.

U.S. Pat. No. 4,897,803 discloses an image processing system where an address designation, or token, is applied to each pixel or data byte a scan line, the token describing the position of the pixel in the scan line. By providing these address tokens, the image information is specifically located in the final image configuration, without requiring storage of the entire image information for manipulation.

U.S. Pat. No. 5,225,911 discloses a circuit for enabling the raster display of text or line art in one constant color against the background of another constant color or against a continuous-toned picture, or the display of a continuous-toned picture through an arbitrary shape.

Co-pending patent application Ser. No. 08/004,479, entitled "Improved Automatic Image Segmentation," assigned to the assignee hereof and incorporated by reference herein, discloses processing image pixels to determine the presence of high frequency halftone images. The disclosed method uses a technique of sampling each pixel in the image to determine whether it is a local area maximum or minimum, and arriving therefrom a binary image function composed of the local area maxima or minima, and using the function for autocorrelation.

According to the present invention, there is provided a method of printing a desired image based on digital data on a substrate. A subset of the digital data relating to a portion of the desired image is identified, wherein pixels associated with the digital data are of a predetermined spatial relationship with pixels intended to be of a different color as the pixels associated with the digital data. The subset of digital data is caused to activate a printhead adapted to emit ink of a first type. Data not of the subset of digital data is caused to activate a printhead adapted to emit ink of a second type, the ink of the first type being adapted to dry at a faster rate than the ink of the second type.

In the drawings:

FIG. 8 which is divided into FIGS. 8A and 8B over two drawing sheets, shows a block diagram of one possible embodiment implementing various aspects of the present invention.

Figure 1:
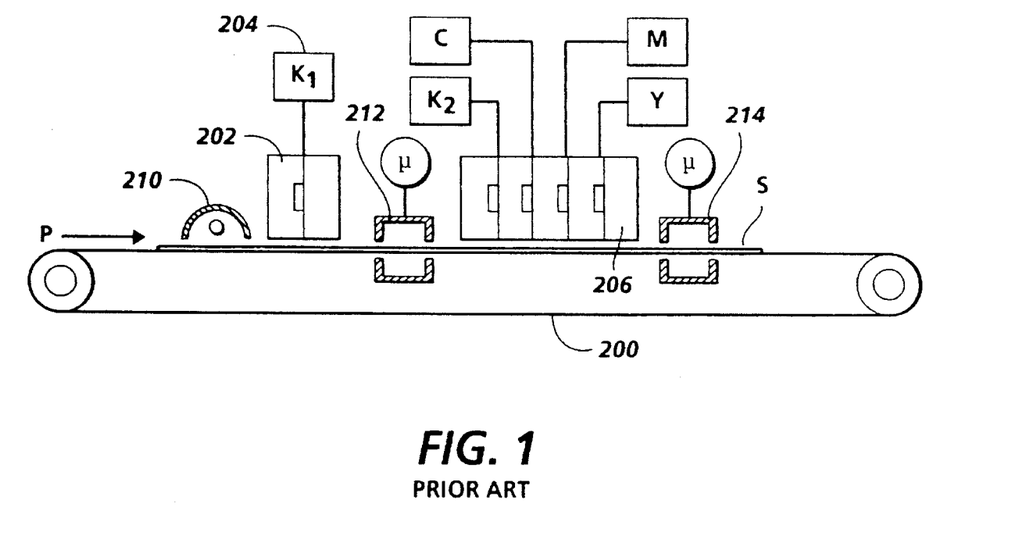
FIG. 1 is an elevational view showing the basic elements of a full-width thermal ink-jet color printer capable of emitting black inks of two types.

FIG. 1 is a simplified elevational view showing the basic elements of a full-width array (FWA) thermal ink-jet printer incorporating the present invention; however is invention is also conceivably applicable to printers of the reciprocating-carraige type. In a FWA printer, instead of causing relatively short printheads to reciprocate across a sheet moving in a process direction, relatively long full-width linear arrays of ejectors are provided which extend across the entire width of a sheet on which an image is to be printed. In the view of FIG. 1, these linear arrays are shown end-on. Sheet S is caused to move in a process direction P by being placed on a belt 200, although other means for causing the motion of the sheet S relative to the printheads are known and can be used, such as placing the sheet S on a rotating drum or a reciprocating platen. A first full-width printhead 202 is located at one point along the process direction of the sheet S, and is fed with an ink supply 204 adapted to emit a black ink of a preselected type $K_1$. Somewhat downstream of printhead 202 is a set of printheads (black, cyan, magenta, and yellow printheads) generally indicated as 206. These printheads, in one embodiment of the invention, are each fed with ink of a primary color, as indicated by the letters C, M, and Y. In addition, one of the printheads in printhead set 206 is fed with a black ink indicated as $K_2$. The ink supply $K_2$ differs from the ink supply $K_1$ in ink supply 204, in that ink $K_2$ is of a different chemical composition so that it will be caused to dry relatively quicker than the "slow-drying" black ink $K_1$, for reasons which have been explained in detail above.

In addition to the full-width arrays of ejectors 202 and 206, there is also disposed along the path of the sheet S ink-drying means, which in this particular embodiment are shown as an infra-red lamp or a cavity for the transmission of microwave energy onto the sheet S, or a heated platen or a heated drum although once again other means for increasing the rate of evaporation on the sheet S may also be used. For illustration purposes, infrared lamp 210 is intended to convey infrared energy to the surface of the sheet S before printing by printhead 202. Optional microwave cavity 212 is operatively connected to a microwave source, and tuned to a frequency which will stimulate the liquid component of ink placed on the sheet S, thereby causing the ink penetration and evaporation thereof. The use of microwave energy may be less useful in initial paper heating, because microwave heating is more effective upon compiling the microwave with ink components, as would be found in liquid ink on the sheet. A further microwave cavity 214 may be provided for a final application of energy to the ink placed on the sheet S after the second printing step. (One of skill in the art if ink-jet printing will recongnize that various types of heating devices, such as microwave or infra-red, may be combined in one apparatus, and also that the selection of which type of heating system is used will cause some ink compositions to become preferable to others, as different compositions may respond differently to, for example, micorwave energy.)

Figure 2:
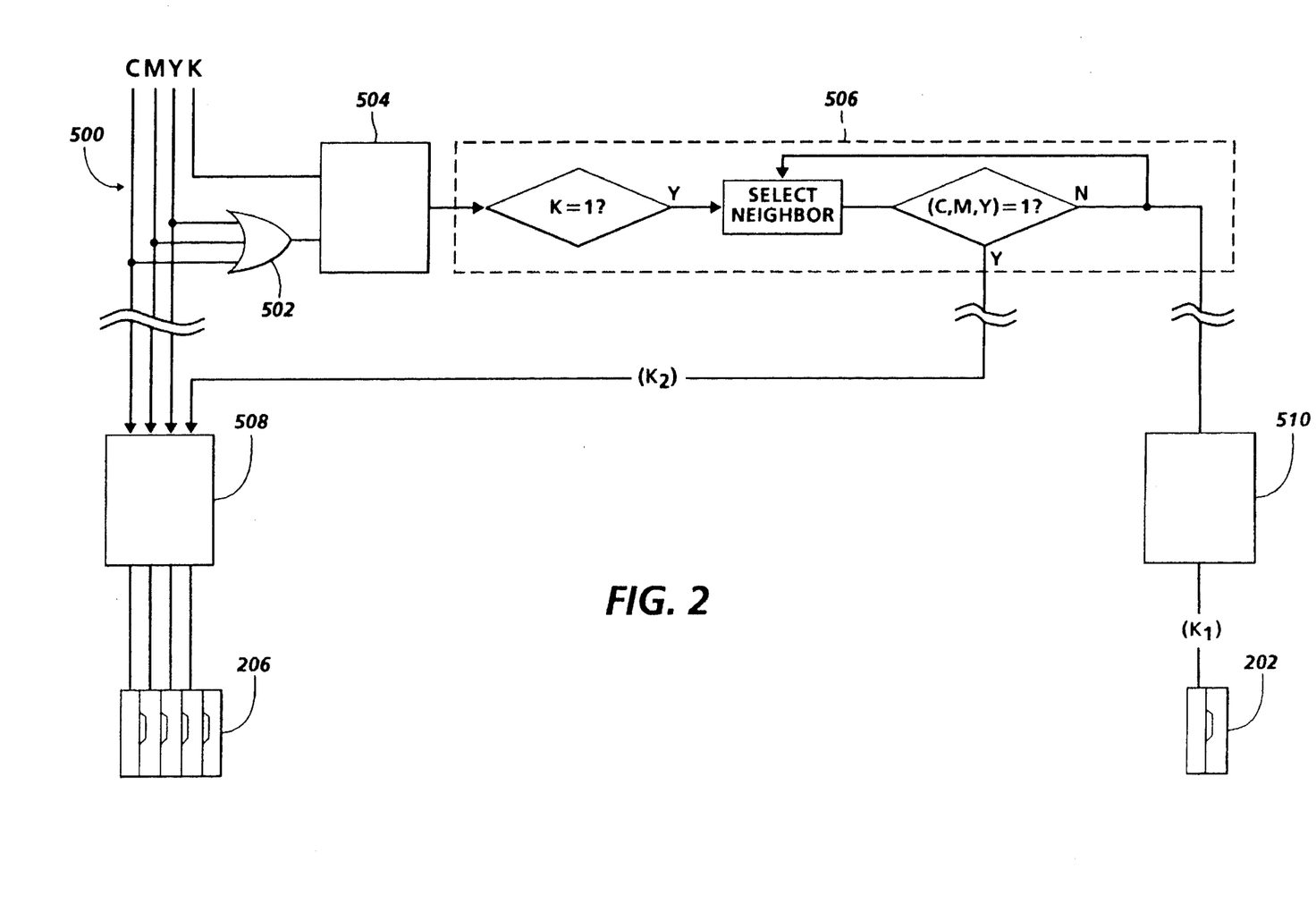
FIG. 2 is a systems diagram illustrating a system for discriminating types of black images according to one embodiment of the present invention.

FIG. 2 is a simplified systems diagram, incorporating a small flowchart, illustrating a basic technique by which a system according to the present invention discriminates between different qualities of black within an image to select the preferred type of black ink for a given situation. It will be noted in FIG. 2 that four data lines 500, marked C, M, Y, and K, are entered into the system, and ultimately activate one or the other of the printheads shown in the diagram of FIG. 1, either the slow-drying black $K_1$ ink from printhead 202, or the fast-drying black $K_2$ or colored inks from printhead 206. Starting with the four data streams, which may enter the system associated with the individual printer by means known in the art, the line carrying the pixel streams for the C, M, and Y separations of the image to be printed are conveyed more or less directly to the printhead 206 to operate the ejectors therein, thereby placing images of the primary colors onto the sheet. As is known in the art, there will also be associated with these lines 500 any number of buffers and timers (not shown) which serve to coordinate the application of image data to the printhead 206 with the behavior of a printsheet passing therethrough, so that the different color separations corresponding to each type of ink are placed in the sheet in a coherent manner. The CMY lines 500 have associated therewith means for allowing the system of the present invention to sense the presence of colored portions of an image as they enter the printer, shown as an OR gate 502. It will be understood to one familiar with the art of digital systems, that any number of digital arrangements, such as shift registers or software applications, could function as an equivalent to this OR gate 502. Simultaneous with the entry of the color data CMY into the system, there will of course be a quantity of data intended to be printed in black in the printer, and this line K does not directly feed to printhead 206, as do the CMY lines, but instead is loaded into a data buffer 504. It will also be noted that also loaded into data buffer 504 is the output of the OR gate 502. There will thus be loaded into buffer 504 not only information relating to the location of black (K) pixels in the desired image, but also information relating to whether pixels of any other color are forming part of the desired image. Generally, for purposes of the present invention in this embodiment, the exact identity of colors for this analysis is not necessary, and therefore the OR gate 502 will be sensitive to any color. The advantage of funneling the color data CMY into one line out of OR gate 502 is that less data need be processed; the pixels forming the desired image, for purposes of this embodiment of the present invention, will either be black or colored. Therefore, fewer data need be processed by the system, and therefore the system can work appreciably faster.

The buffer 504 temporarily stores image data in a first in first out (FIFO) manner so that an individual pixel datum may be analyzed by a comparison with its immediate neighbors, in a manner which will be explained in detail below. Because ink-jet printing is a binary process (i.e., for a given pixel location within a desired image, there will either be the emission of an ink droplet or not) the data ultimately transmitted to the printheads 202 and 206 will be in the form of strings of pixels, each byte in the string being a 1 or 0 depending on whether that particular location in the desired image is to receive ink of any color. In the convention used in this description, the number "1" indicates that the particular location will receive a droplet of ink from a printhead, and "0" indicates that no ink of a particular color will be emitted thereon. However, because this is a full-color system, the droplet of ink will be of one selected primary color; in a full-color system, non-primary hues are created by placing pixels of primary colors adjacent each other on the sheet in various proportions, allowing the observer's eye to blend the pixels of primary colors together. A key function of the present invention is to identify locations on the final desired image where black pixels abut, or are within a predetermined distance range from, locations of color pixels. Where the black pixel area is within a certain distance from the color pixel area, the system will chose a fast-drying ink. Where the black pixel is within a certain distance of only other black pixels or areas where no ink is to be emitted, the system will chose the slow-drying black ink.

There is thus provided in the system of the present invention an "analyzer" indicated as 506 in FIG. 2, which is here represented as containing a flowchart of the analyzing function carried out by the analyzer. The analyzer can be embodied in hardware or software, as would be apparent to one of skill in the art, and is defined by the flowchart indicated in FIG. 2. There is entered into analyzer 506 two species of information: whether a droplet of ink will be emitted for that particular pixel location, and whether that emitted droplet will be black or of another color. This information is received in buffer 504, which stores a quantity of pixel data for a given time, because, as will be noted below, the analysis will require examination of pixel data both previous to and after the pixel datum actually being considered at a given moment. When a given pixel datum is entered into analyzer 506, the first inquiry is whether the particular pixel is intended to be a black droplet, this inquiry being indicated by the shorthand K=1. If the answer to this inquiry is yes, the analysis proceeds to the next stage. If the answer to this inquiry is no, this means either that there will be no ink of any kind emitted for that pixel location, or that the ink will be a colored ink, in which case such information will be going to printhead 206 anyway.

The next step in the analysis is to examine a plurality of neighboring pixels around the pixel in question. The idea of a "neighboring pixel" can be defined in any number of ways, depending on the specific design of the printer, and the specific requirements of print quality and speed. In general it may be said that a neighboring pixel will be one of a preselected plurality of pixels around the pixel in question, either directly abutting the pixel in question, or a preselected number of pixel locations away from the pixel in question. As shown in FIG. 2, once a neighbor is selected, the inquiry is whether the neighbor is a color pixel, shown by the shorthand C, M, Y=1. If the answer is yes, then the black pixel in question will be sufficiently close to a colored pixel that intercolor bleeding will be a problem, and therefore the fast drying ink $K_2$ will be required as shown. If, after testing a preselected number of neighboring pixels, it is determined that all of the neighboring pixels are either black or blank (no ink of any kind), then a slow-drying black ink $K_1$ from printhead 202 may be used. As may be expected, the effect of this analysis will be to select the fast-drying black ink in situations such as reproducing color images, wherein black areas are directly abutting colored areas, while pure black areas, such as in text, are printed with slow-drying black ink.

Figure 3:
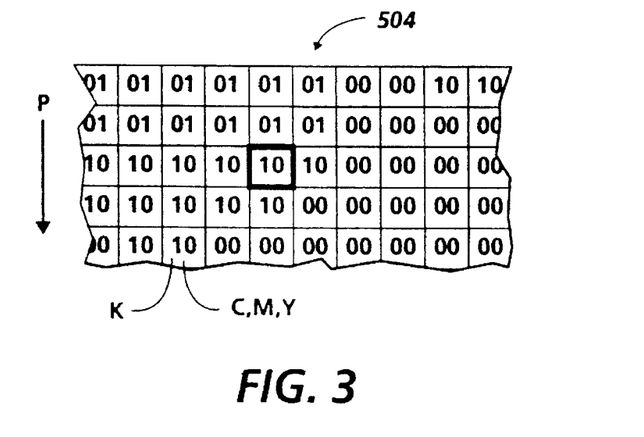
FIG. 3 is a diagram illustrating the placement of pixels of a given relationship according to one embodiment of the present invention.

FIG. 3 is a symbolic representation of the behavior of image information within the buffer 504. As mentioned above, analysis of the neighboring pixels of a given pixel in question will require that, if the pixels are coming through the system in a stream or series of parallel streams, that certain pixels both "before" and "after" in the pixel in question be polled. Thus, it is required that buffer 504 have sufficient capacitance as a FIFO buffer to retain image data sufficiently ahead of and behind the pixel in question so that the necessary neighboring pixels may be available for polling. As represented in FIG. 3, the datum for each pixel is placed in its own cell, and identified by a two-bit word, in which the first bit indicates whether the droplet is intended to be black and the second bit indicates that the droplet is intended to be colored. Thus, a word 10 will indicate a black pixel, 01 will indicate a colored pixel, and 00 will indicate no ink being emitted for that particular location on the print sheet. (A datum of 11 would be theoretically possible, of course, but useless in a practical system, because there would be no reason to emit black and a color on the same location on the sheet.) In FIG. 3 the various pixel data are formed in an array, representing physical positions of the pixels as they will appear on the printed image. The indication of the process direction P, which is also shown in FIG. 1, gives an idea that the various pixels relate to each other spatially in two dimensions, the vertical dimension being that of the direction of a print sheet through the machine. According to the convention shown in FIG. 3, the pixel data in the bottom line of cells would be printed first, and then in succession upwards. In the full-width printing system of FIG. 1, all of the pixels in a given horizontal line in FIG. 3 are printed essentially the same time. Because of the nature of a FIFO buffer, the pixels to be tested relative to the main pixel in question will always be located in the same memory cells—the FIFO process serves to push along all of the pixel data in a "bucket-brigade" fashion with every new pixel datum entering the buffer, so new data will always appear in the cells corresponding to the locations to be tested.

In FIG. 3, the pixel datum being checked at the given moment shown is that indicated by the dark-border square. With reference to FIG. 2, and the above convention, it is clear that the pixel datum within the square, 10, is intended to be a black pixel. Further, it will also be noted that certain of the direct neighbors to the pixel in question are also black (10), but the pixels "above" the pixel in question in FIG. 3 are colored, or 01. The pixel in question shown in FIG. 3, then, represents a black pixel which is directly abutting colored pixels. Going through the flowchart within the analyzer 506 in FIG. 2, and sticking to a strict definition of "neighboring pixel," this pixel in question will have to be printed with the slow-drying ink $K_2$.

However, the system may also be so modified that the definition of "neighboring" can be expanded. This may be necessary if the observed behavior of certain types of ink cause them to bleed more than one pixel space. Thus, it may be necessary to poll not only the directly neighboring pixels but also those pixels of which are two pixel locations away from the pixel in question. If any of these create a close proximity of black to colored droplets, then the slow-drying $K_2$ ink should be used. Of course, depending on the desired speed and other characteristics of the machine, one may which to test any or all of certain neighboring pixels any given distance from the pixel in question. The broader the "range" of neighboring pixels being polled, the larger the buffer 504 must be.

After the different subsets of data relating to the black portion of the desired image to be printed are separated by analyzer 506, it will be necessary to provide temporary buffers, such as 510 and 508, immediately associated with printheads 206 and 202 respectively, to hold the image data temporarily until the data can be used to "fire" the printhead to place the desired image on the sheet. As will be appreciated by one of skill in the art, the behavior of the various printheads in the apparatus must be coordinated with each other, and further coordinated with the sheet-transport mechanism of the individual printer, so that a coherent full-color image can be created on the sheet.

Although the embodiment of FIGS. 2 and 3 shows a straightforward implementation of the system, by actually detecting the proximity of black areas to colored areas within the printed document, it may be possible, particularly in a high-speed system, to provide other electronic means to substantially accomplish the same object by approximation. In other words, in certain situations it may not be necessary to actually look at every individual neighboring pixel to determine which type of black ink is to be used, because other phenomena which may be more easily measured may be satisfactorily indicative of a close proximity of black and colored areas in streams of image data. Particularly, if it is known in advance that the vast majority of documents will include black text, separated by blank space from discrete full-color illustrations, this foreknowledge can be used to create a simple pattern-recognition system which will be able to detect whether text or a full-color illustration is being printed. If signals relating to the operation of various printheads are monitored over time, such as when these signals are being fed to the printheads as the print sheet is moving relative thereto, "data streams" which may have frequency-like characteristics can be detected. The data streams associated with printing text are likely to have certain characteristics, such as unique frequency properties, which will be readily detected, while data associated with full-color images will have different frequencies, and will of course call into play data streams associated with colored inks.

To take a simple example, if for a given subset of time as data is entering the printing apparatus, the black pixel stream is exhibiting a reasonably consistent frequency, while there is no activity whatever from the color data streams, it can be concluded that black text is being printed. If, however, the data streams from the color channels and the black channels are simultaneously exhibiting behavior of comparable frequencies (while, of course, the two streams are directed to proximal areas within the image to be printed), it is reasonable to infer that a portion of a full-color image is being printed, and therefore fast-drying black ink would be preferred.

Figure 4:
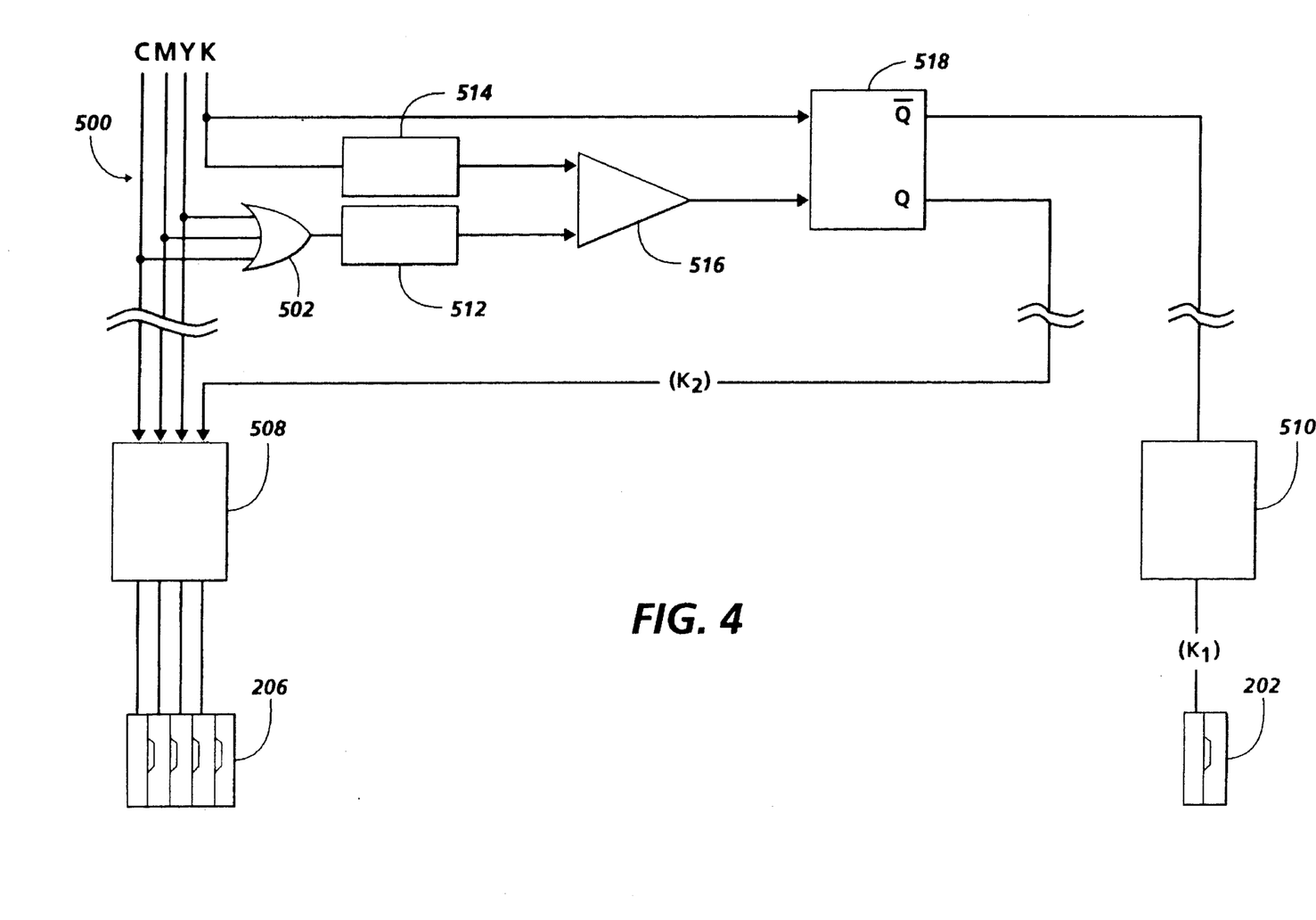
FIG. 4 is a systems diagram showing a system according to another embodiment of the present invention.

FIG. 4 is a systems diagram illustrating the basic elements of a pattern-recognition type system for analyzing the black image data in a desired image to be printed. As in the above-described embodiment, the color data streams CMY are sampled through an OR gate 502, to detect the presence of data associated with any non-black color. The data from the OR gate 502 is sent to a pattern-recognition system generally indicated as 512. Simultaneously, the black image data is sent to another pattern-recognition system indicated as 514. The purpose of the pattern-recognition systems 512 and 514 is to output a predetermined signal when the input is of a recognizable pattern consitent with black and color pixels being intermingled. The two types of pattern-recognition need not be the same for the black and colored cases: indeed, the "pattern" that need be detected by pattern-recognition system 512 may possibly be only the presence of any quantity of colored data at a frequency comparable to a simultaneous frequency of black pixels on K line 500, which would be indicative of a general intermingling of black and color pixels, as in a color photograph.

Several systems in the prior art are known for determining this distinction between text patterns and halftone patterns. In particular, U.S. Pat. No. 4,811,115, assigned to the assignee of the present application and incorporated by reference herein, discloses a method and apparatus for processing a stream of image pixel data, such as on the K line 500, to determine the presence of high-frequency half tone data by applying a particular special function. In brief, "auto correlation" means that the data is analyzed in a stream to detect the presence of minima or maxima in the stream at times indicative of a predetermined halftone image frequency. Minima or maxima occurring at certain positions in the pixel stream indicate certain frequencies of the data. These periodically-occurring positions where minima or maxima are looped for are called "offsets," and multiple offsets (in numbers of pixels) may be tried to determine the frequency of a possible halftone, in a manner described in detail in the above patent. The pattern recognition systems 512 and 514 which may be used in this embodiment may be sensitive to certain frequencies associated with the printing of halftone images as opposed to text.

The signal outputs from pattern-recognition systems 512 and 514 are each fed into an AND gate 516. In this illustrated embodiment, AND gate 516 outputs a predetermined function when the systems 512 and 514 both output signals indicative of halftone patterns. The output of AND gate 516, which will be of a predetermined nature in response to halftone data, is then output into a logical device generally indicated as 518. Also entered into logical device 518 is a direct line from the K channel from line 500. There will thus be input into logical device 518 a raw input of whether black ink of any kind is to be printed by one printhead or another, and also a signal on whether that particular black image datum is part of a halftone pattern. The outputs of logical device 518 are preferably of such a nature that the output of each of two lines, as shown, are complementary to each other. In this way, if the two inputs to logical device 518 are such that a black datum is output in a half tone pattern, the output from device 518 will be sent to buffer 508 and printhead 206 while, if the inputs indicate a black image datum not in a halftone pattern (i.e., with the input of AND gate 516 low), the output will be sent via buffer 510 to printhead 202. If the direct datum input to logical device 518 is low, of course, this indicates that no black ink of either kind is emitted for that datum. Alternate configurations of digital circuit elements achieving an effect equivalent to that shown in FIG. 4 would be apparent to one of skill in the art.

The above-described embodiment of the present invention are intended to be placed at the extreme "back end" of a printing system; that is, to create minimum disruption to an existing image-processing system or network, the location of the "splitting" of the black portion of the image should occur as close to the actual printing apparatus as possible, preferably just one step before the ink is actually applied to the paper. Indeed, if the system of the present invention, which is required specifically for a unique type of full-color ink-jet printer, is merely placed as a "black box" within the actual printer, the printer itself can be used in a "plug and play" relationship with a much larger system, without any system user worrying about data requirements for the particular printer. However, the realities of large-scale printing, particularly within a network, may provide opportunities for a system requiring the division of different types of black portions of an image, to exploit pre-existing conditions to enable a very fast process. For example, in many network printing systems, text and images going into one document may in fact emanate from different software sources, only to merge relatively late in the printing process. Thus, if there is provided a data stream within the system which is known to include only text (which is almost invariably printed in black), it may be useful to provide a "direct line" from the text source to the slow-drying ink printhead, while any other black portion of the final image will be printed with the fast-drying black ink.

While the basic systems described in the above embodiments illustrate general principles by which halftone areas of an image to be printed can be detected, it may be found that, as a practical matter, more sophisticated techniques for detecting certain types of images, such as halftones of different frequencies, may be necessary for satisfactory printing of desired images. The simple examples described above are probably most useful for "artificial" images, that is, images created by application software. Generally such images, which include text, background colors, relatively simple illustrations, and line art, will not heavily tax the resolution capabilities of an image-processing system. Difficulties may arise, however, when complex images, such as digitized color photographs, are introduced to the system. In order to render such images accurately, it is known, particularly in the xerographic arts, to use techniques such as superpixeling, which involves dividing each pixel area in the image into a plurality of smaller cells, which accept different proportions of primary colors; the chosen proportions of the primary colors within each individual pixel will create individual pixels having unique hues. Such techniques may be incompatible with a simple pixel-by-pixel analysis system as described in the above embodiments.

Another challenge to image-processing systems occurs when fully-formed hard-copy complex images are scanned directly into a system and are then themselves treated as individual images, such as magazine articles with lithographed photographs. In such cases, the image content of the original document may consist of combinations of high frequency halftones, low frequency halftones, continuous tones, and line copy, in some unknown proportions. In such a case, optimizing the image processing system from one image type in an effort to offset the limitations in the capability of the printing apparatus, may not be possible, requiring a compromise choice which may not produce acceptable results. For example, where one optimizes a system for low frequency halftones, it is often at the expense of degraded reproduction of high frequency halftones or of line copy, and vice-versa. If the system is expected to perform satisfactorily under these conditions, it is probably necessary that the pattern recognition systems, such as those shown as pattern recognition systems 512 or 514 in FIG. 4, employ relatively sophisticated pattern-recognition techniques.

One such technique which is known in image processing for xerographic purposes is shown in U.S. patent application No. 08/004,479, entitled "Improved Automatic Image Segmentation," assigned to the assignee of the present application. This technique generally uses an "auto-correlation" function as a reliable test of the difference between halftones and line art. It has found that an important type of error with such systems is the false characterization of a portion of the image as a halftone, when in fact it would be preferable for the image to be processed as a line image. Examples of this defect are noted particularly in the processing of Japanese kanji characters and small Roman letters. As applied to an ink-jet system of the present invention, a false detection of a halftone as line image will result in the application of a slow-drying black ink within a halftone image, and it is likely that the slow-drying black ink will bleed into the neighboring colored-ink areas. When a hard-copy lithographic image, such as from a magazine, is scanned into the system, such color images typically include the superposition of plural separations of image data at selected frequencies, but having the screens processed at angles with respect to each of the other screens. Accordingly, the response obtained after auto-correlation is not the same as a response from a black and white image having a singe screen frequency. In brief, it has been found that certain relatively common printing situations require fairly sophisticated techniques discriminating halftone patterns from line art, or any other image which in the present invention would be preferably printed with slow-drying black ink.

What follows herein is a condensed description of the halftone recognition system described in fuller detail in U.S. patent application No. 08/004,479, which is incorporated into the present applcation by reference.

Figure 5:
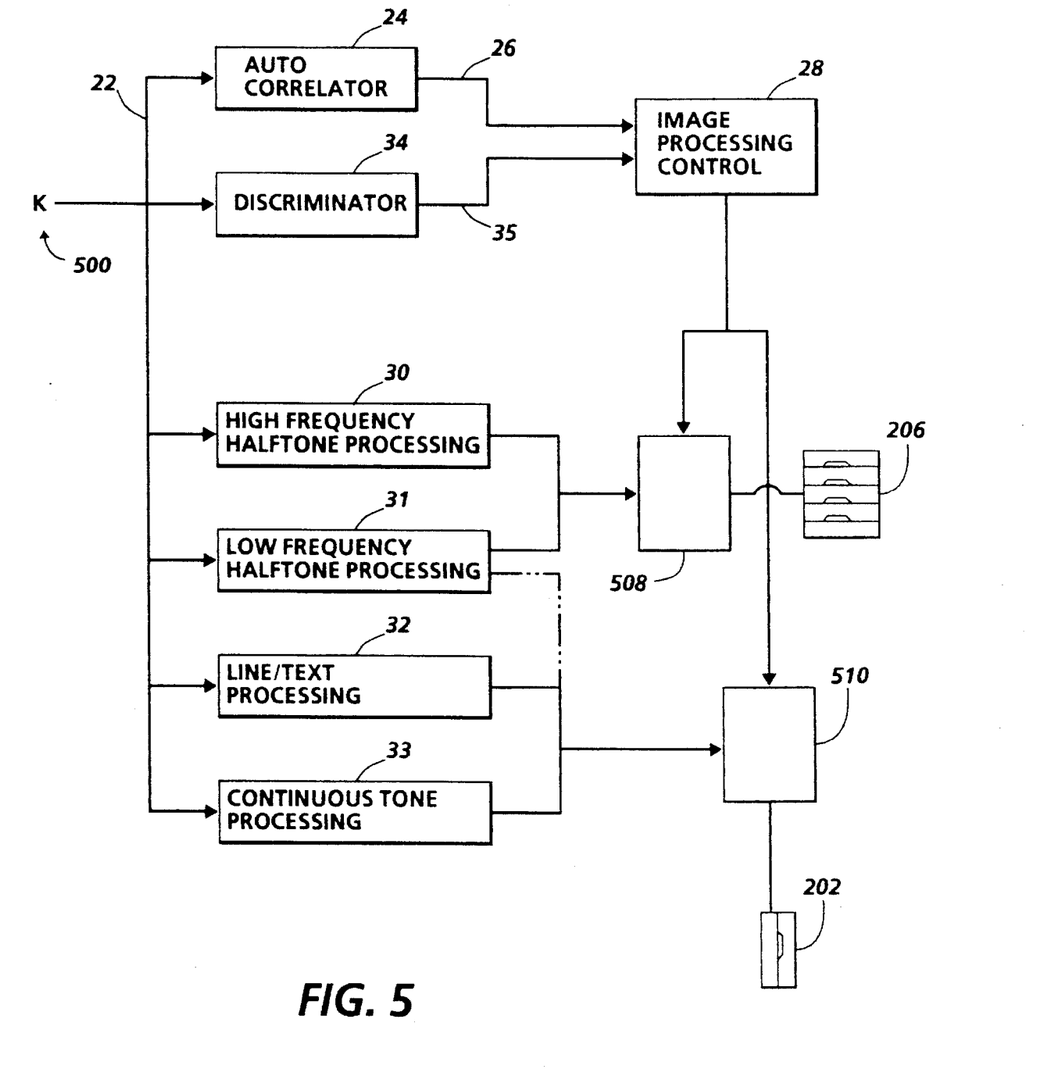
FIG. 5 is a block diagram of an image data processing system incorporating another embodiment of the system of the present invention.

FIG. 5 demonstrates a halftone-recognition system as it relates to black image data. The black image data is made available to the image processing system along data bus 22. The black image data at this point is in its raw gray format, for example, 6–8 bits per pixel. To detect the presence of high frequency halftone image data, a one dimensional block of image pixels is unloaded, as from a K black-data line 500 as in the previously-described embodiments, onto a data bus 22. Although in the above-described embodiments of the invention, the pixel data on the various lines is preferred to be already in largely binary form, as it is typically accepted by ink-jet printers, the pixel data in the embodiment of FIGS. 5–8 may be of a high-resolution gradation, or even analog data, as though it were being read in raw form from a raster input scanner, which may conceivably assign each pixel a gray-scale value from 0 to 15, or even 0 to 255 for each primary color. The embodiment of FIGS. 5–8, then, is particularly suitable for such situations as ink-jet copying. The block of image pixels is passed to halftone detector 24 which auto correlates each pixel group in accordance with a predetermined algorithm to determine if the image data contains halftones or not. An output on line 26 instructs the image processing control 28 to handle the data in accordance with whether high or low frequency halftone image data has been detected. A suitable block size is 16 pixels at a time at 400 spots/inch, or 12 pixels at a time at 300 spots/inch. Too large a sample size has a tendency to cause a blurred result, while too small a sample size does not contain a large enough amount of data for a good sample of the function. Either case would result in inaccuracies in detecting halftone image data.

The presence of line copy and/or continuous tone data is determined by discriminator 34. Discriminator 34 functions to produce an output on line 35 indicative of the presence of line copy or continuous tone image data, instructing image processing control 28 to handle data in accordance therewith.

The pure black data K from line 500, which is in parallel with the color data coming through other channels on the bus as in the embodiments of FIGS. 2 and 4, is made available through line 22 to an auto-correlator 24 and a discriminator 34, which are in turn used to control an image processing control here indicated as 28. In addition, the raw black data is simultaneously sent trough a high-frequency halftone processing station 30 and a low frequency halftone processing station 31. As can be seen in FIG. 5, these two halftone processing stations are in this particular embodiment operatively connected to the buffer 508 which, in turn, is used to activate the fast-drying black ink printhead in the fast-drying ink printhead assembly 206. What is intended is that this type of data associated with either high-frequency or low-frequency halftone processing be printed with fast-drying black ink. Simultaneously, the same raw black data is sent to a line/text processing station 32 and a continuous tone processing station 33. The black data which is passing through these stations are used, as their titles indicate, to print lines or text, or other continuous-tone images, which are conducive to printing with the slow-drying black ink. As such, these stations 32 and 33 are ultimately connected to the buffer 510 for subsequent use for activating the slow-drying black ink printhead 202.

The illustrated embodiment of the present invention is capable of making a distinction between low-frequency halftones and high-frequency halftones, and optionally sending on low-frequency halftones to the slow-drying ink printhead 202, as shown by the dotted line from box 31 in FIG. 5; this distinction may be useful in extremely high-speed applications, or in some situation in which as much or as little of a certain type of black ink is to be used as possible. If, for example, it is preferred to use as much slow-drying black ink as possible, it may be possible to get away with using slow-drying black ink in low-frequency halftones, such as in certain types of photographs, saving the fast-drying black ink only for relatively detailed areas of high-frequency halftones.

Although the illustrated version of this particular embodiment of the system of the present invention is directed only to black inks and deciding which type of black ink is to be used, it is conceivable that such a system may be obliged to any color ink in a color system, or even providing a system in which each primary color comes in a fast-drying or slow-drying version.

Image processing control 28 serves essentially as a switch to allow data from the image processing sections, including high frequency halftone processing section 30, low frequency halftone processing 31 and line image processing section 32 and continuous tone processing section 34, to flow through bus 36 to an output buffer 508 or 510, as required, in accordance with the detection of data in the particular mode. Image processing control 28 controls data bus 36 to allow data flow from each processing section, in accordance with the signals passed thereto from halftone detector 24 or discriminator 34. Each processing section processes all image data in accordance with its function, but only that data appropriately processed is allowed to pass to its related output buffer for printing by the appropriate printhead.

Figure 6:
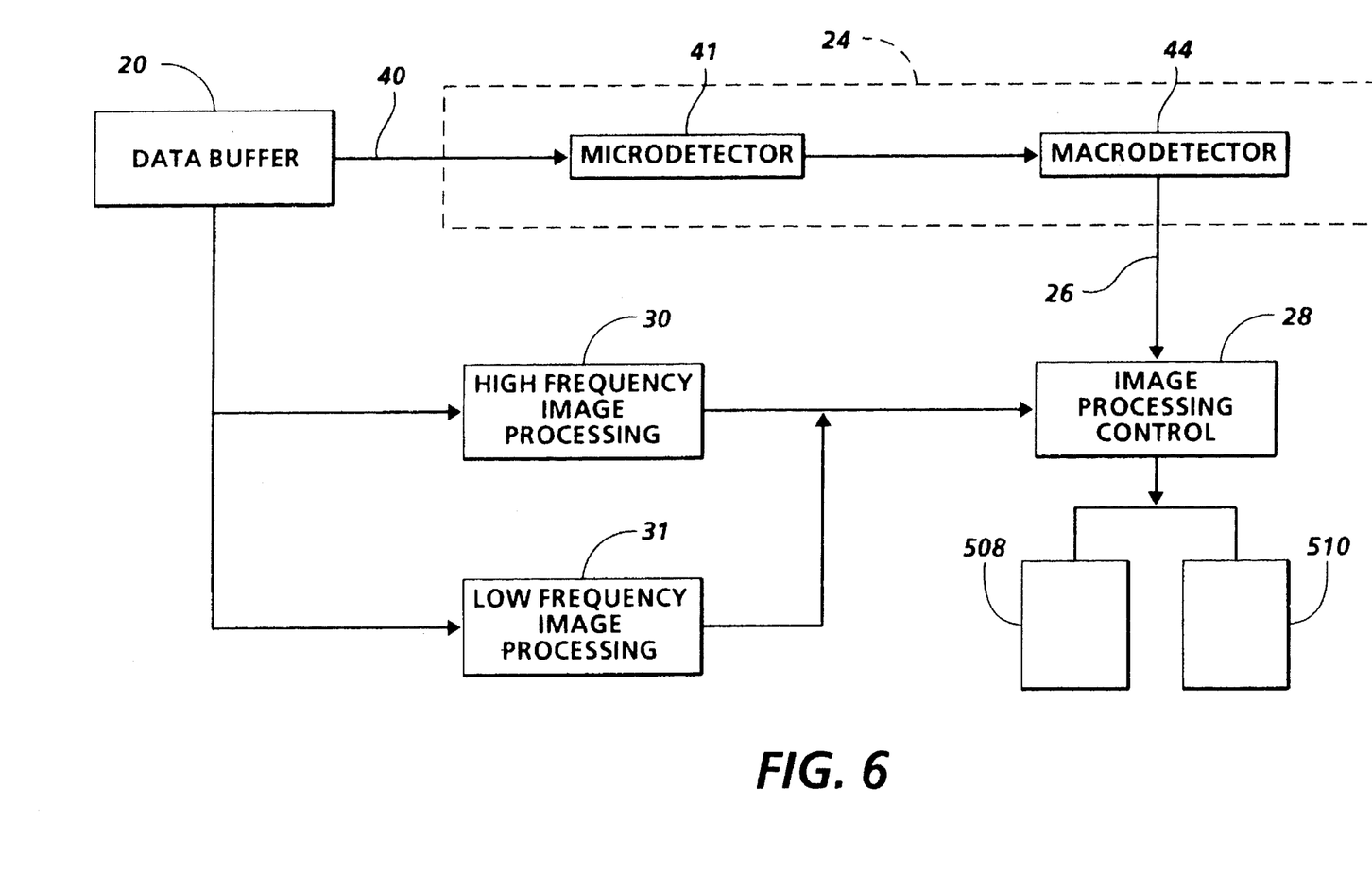
FIG. 6 is a block diagram of the main system elements of an auto-correlator of FIG. 5.

With reference now to FIG. 6, the halftone detector 512 broadly includes two sections. Microdetector 41 operates to detect and establish discrete spans of detected halftone pixels. Macrodetector 44 operates to join detected halftones into continuous regions. A signal from macrodetector 44 establishes the image processing method with which image processing control 28 handles the image data.

Figure 7A:
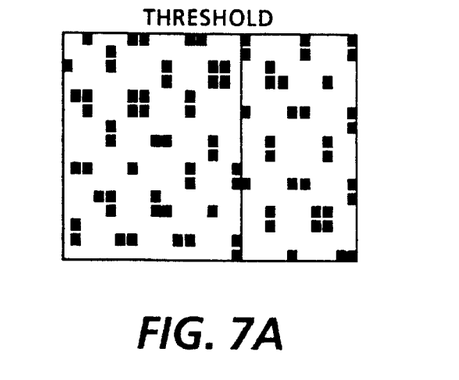
FIGS. 7A–C demonstrate an example of the process of generating video minimum and maximum functions, and the results of the application of an auto-correlation function on the video minimum and maximum functions for a monochrome image.
Figure 7B:
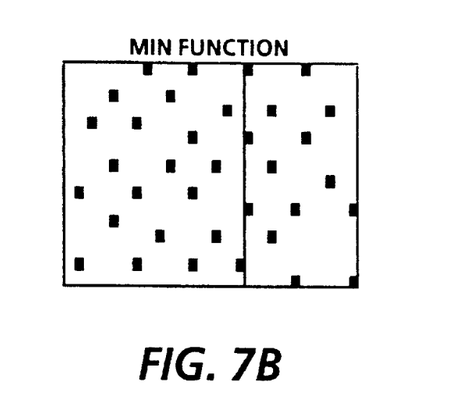

FIGS. 7A and 7B represent operation in accordance with the invention on a highlight area of a 26 pixel by 20 scan line image portion, including a 120 line per inch (lpi), 45° halftone scanned at 400 spi in each direction. FIG. 7A shows a portion of an image, which for illustration purposes, has been previously thresholded, although this is not a requirement of the invention. Each pixel $V_{i,j}$, where the index i refers to scanlines, and the index i refers to pixels in a scan line, is then compared with a preselected group of neighbors, in this case 8 adjacent pixels, and their average value $Avg_{i,j}$. Pixel $V_{i,j}$ is determined to be a maximum if the gray level value of the pixel is greater than all 8 of the neighboring bits. In a preferred arrangement, to be declared a maximum, pixel $V_{i,j}$ must also be greater than the neighborhood average by a predefined noise margin. Pixel $V_{i,j}$ is likewise declared a minimum if $V_{i,j}$ is less than all of the neighboring pixels, and also is less than the neighborhood average by a predefined noise margin. In the described example, the noise margin is 8 levels, out of 0–255 levels. The results of this step are minima and maxima functions, having one bit per pixel patterns, shown in FIG. 7B. The periodic nature of the halftone becomes much more apparent when the local area minima/maxima function is taken, as shown in FIG. 7B. A running average of the video is kept over the area to determine whether the image is relatively light or dark. In accordance with this determination, the minima function is used when the image is relatively light, and the maxima function is used when the image is relatively dark. The selected pattern (in this case, a minima pattern) is then used to compute the auto correlation function, a formula for which is given in the patent application incorporated herein by reference. Also of interest in the field of autocorrelation functions is U.S. Pat. No. 4,811,115, entitled "Image Processing Apparatus Using Approximate Auto Correlation Function to Detect the Frequency of Half-Tone Image Data," assigned to the assignee hereof. As mentioned earlier, "auto correlation" means that the data is analyzed in a stream to detect the presence of minima or maxima in the stream at times indicative of a predetermined halftone image frequency. Minima or maxima occurring at certain positions in the pixel stream indicate certain frequencies of the data. These periodically-occurring positions where minima or maxima are looked for are called "offsets," and multiple offsets (in numbers of pixels) may be tried to determine the frequency of a possible halftone, in a manner described in detail in the above patent and application.

Figure 7C:
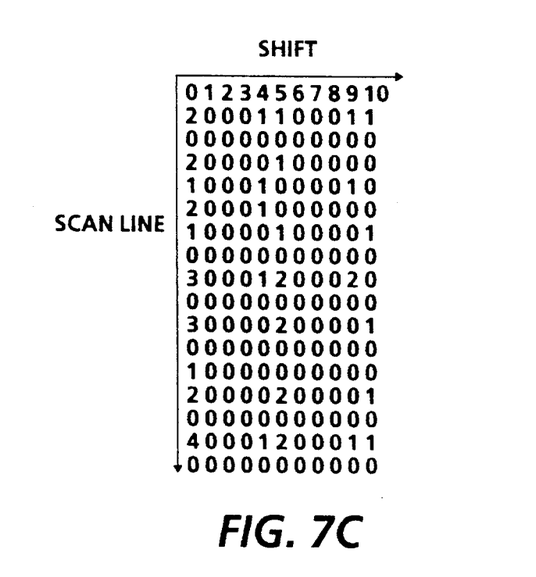

The auto correlation function can be treated as a logical AND operation operable on the image data. FIG. 7C shows the results of the auto correlation function for blocks of 16 pixels at 11 offsets, (n=0, 1, 2, . . . 10) for each scan line. Non-zero entries are found at shifts 4, 5 and 9, 10, corresponding to the projected wavelength and multiples of the 45° halftone.

Figure 8A:
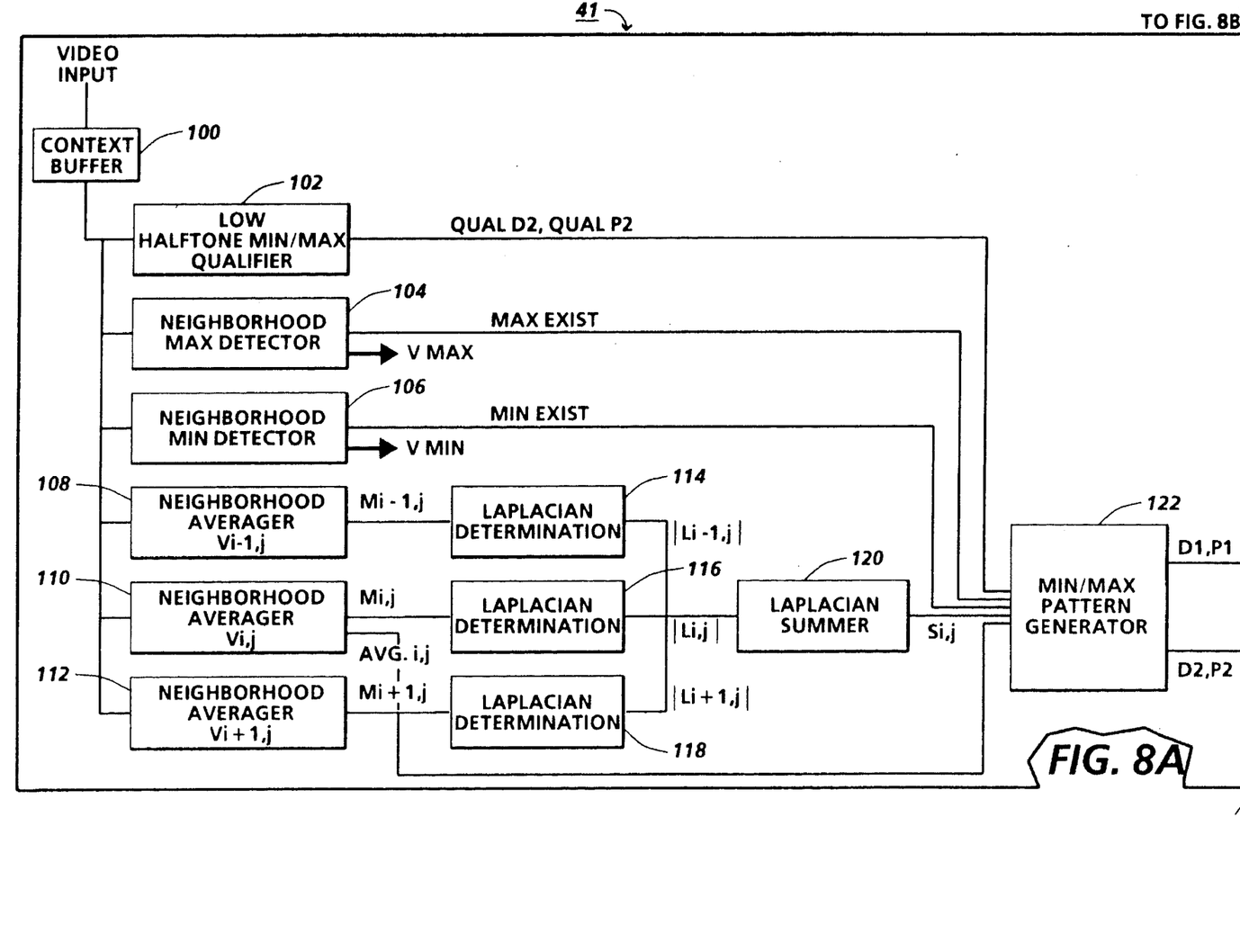
Figure 8B:
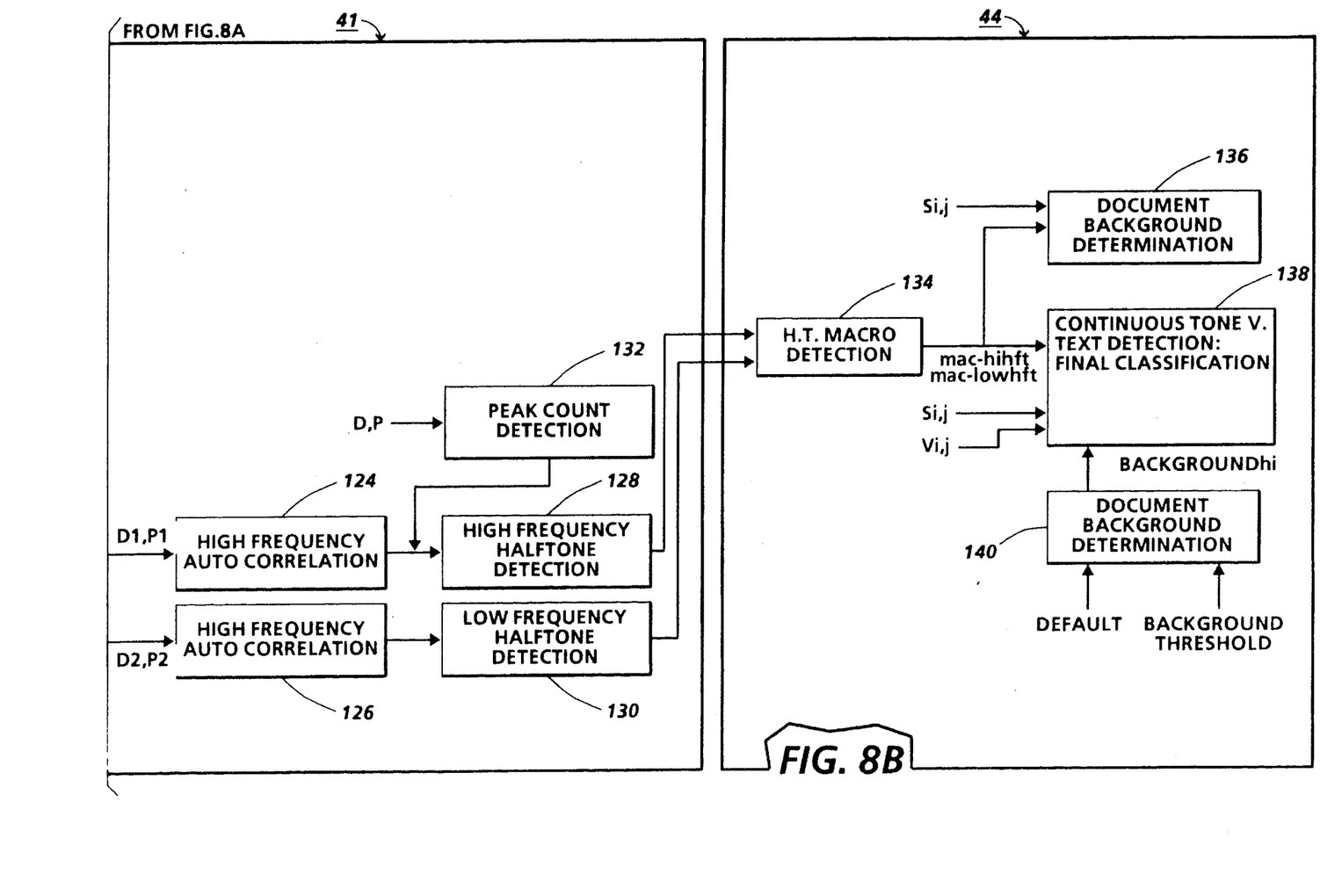

With reference now to FIG. 8, wherein a block diagram of one possible embodiment of a halftone detection arrangement in accordance with the invention (and shown as details of microdetector 41 and microdetector 44 in FIG. 6) is shown, video input is initially delivered to a context buffer 100, which for a pixel $V_{i,j}$ under consideration, stores a 5×5 matrix of pixel values centered on pixel $V_{i,j}$. The values are initially directed to low frequency halftone min/max qualifier 102, which is directed to confirming, for low frequency halftones, that the center pixel $V_{i,j}$ has a value either lower or higher than the neighboring pixels. The output flags of qualifier 102, QualD2 and QualP2, are used to qualify the decision to set the pattern bits D2 and P2 for low frequency halftones. The four neighbors in a 3×3 kernel centered on $V_{i,j}$, which are directly above, below and to the right and left of the pixel $V_{i,j}$ are compared with the four neighbors in the expanded 5×5 kernel which are directly above, below and to the right and left of these neighbors. The flag, QualP2, is set if the neighbors in the 3×3 kernel are greater than or equal to the neighbors in the 5×5 context (ensuring the pixel $V_{i,j}$ is a peak). The flag, QualD2, is set if the neighbors in the 3×3 kernel are less than or equal to the neighbors in the 5×5 context (ensuring the pixel $V_{i,j}$ is a valley).

Image signals are also directed from context buffer 100 to neighbor maximum detector 104 and neighbor maximum minimum detector 106, which respectively detect whether pixel $V_{i,j}$ is a maximum or minimum with respect to its neighbors. In the neighbor maximum detector 104, a determination is made whether the gray level value of the center pixel being processed, $V_{i,j}$, is greater than the values of its eight neighbors. This is accomplished by successively comparing two pixels at a series of comparators which produces outputs indicative of the neighborhood maximum $V_{max}$. Once the maximum video value $V_{max}$ within the eight neighbors is found, it is compared to the center pixel, $V_{i,j}$. If $V_{i,j}$ is greater than this maximum value then a flag, MaxExist, is set. This is repeated for each pixel in the scan line. The neighbor minimum detector 106, operates in essentially the same manner, except that the determination tests whether the pixel, $V_{i,j}$, has the smallest gray value when compared to its eight neighbors, $V_{min}$. If $V_{i,j}$ is the minimum value in a 3×3 kernel then a flag, MinExist, is set. This is repeated for each pixel in the scan line. The two flags, MaxExist and MinExist, will be used in the min/max pattern generator, as well as in the generation of the halftone micro detection flags, as will be explained further below.

Neighborhood averagers 108, 110 and 112 sum and average the eight neighbors of center pixel $V_{i,j}$. Each averager respectively derives average values $M_{i-1,j}$, $M_{i,j}$, $M_{i+1,j}$, for pixel locations $V_{i,j}$, $V_{i-1,j}$ and $V_{i+1,j}$, by summing the values of the 8 neighbors, and subsequently dropping the three least significant bits. This average value is used to determine both a Laplacian sum, as will be described hereafter, as well as the $D_1$, $D_2$, $P_1$, and $P_2$ pattern bits. The three averages are used to compute the Laplacian sums needed for context when computing the Laplacian Sum, $S_{i,j}$. The average of $V_{i,j}$ and its neighbors, termed, $Avg_{i,j}$ is also derived.

The absolute value of the Laplacian is found by subtracting the center pixel from the average of its eight neighbors, $M_{i,j}$ and taking the two's complement of the result if it is negative. ($|L_{i,j}|=|M_{i,j}-V_{i,j}|$). The absolute Laplacian values are determined at block 114 (operating on $M_{i-1}$), 116 (operating on Mi) and 118 (operating on $M_{i+1}$). The absolute Laplacian values are then summed at Laplacian summer 120. The absolute value of the Laplacian for $V_{i,j}$ and each of its eight neighbors is summed together and termed $S_{i,j}$. This value is used as a discriminator for text and continuous tone. Image areas which are determined not to be halftones, having video near background or black, and having a high Laplacian sums are classified as text. Otherwise, those image portions are classified as continuous tone.

Minimax pattern generator 122 determines if the following relationships are true: $S_{i,j} \geq NoiseSum$, $(V_{i,j}-LowNoise)>M_{i,j}$, $(V_{i,j}HighNoise)>M_{i,j}$, $(V_{i,j}+LowNoise)\leq M_{i,j}$ and $(V_{i,j}+HighNoise)<M_{i,j}$. The noise values are programmed values as previously described. The results of these tests, the flags MinExist and MaxExist, and the low frequency qualifiers $QualD_2$ and $QualP_2$, are used to set the maximum pattern bits $P_2$, $P_1$, and minimum pattern bits $D_2$, $D_1$, which represent the maxima and minima functions which will be subjected to the auto correlation function. $P_1$ and $P_2$ represent peaks of the signal while $D_1$ and $D_2$ represent valleys of the signal. The auto correlation function is then applied to the data signals $D_1$ and $P_1$ at high frequency halftone auto correlator 124. The auto correlation function operates on either $D_1$ or $P_1$, depending on a flag DIP generated at low frequency auto correlator 126, as to whether the average value of pixel $V_{i,j}$ and $Avg_{i,j}$ over the auto correlation block is greater than a reference value representing a mid-tone value, which represents whether the image is relatively dark or light. At high frequency auto correlator 124, the auto correlation function for testing the presence of high frequency halftones is applied to obtain results for pixel shift positions 2, 3, 4, 5 and 6.

Low frequency auto correlator 126 is essentially the same as high frequency auto correlator 124 with the exception that the D2 and P2 bit patterns are used from min/max pattern generator 122. There is also a longer shift register for the D2 and P2 bits since more auto correlation shift positions are examined for low frequency halftones. The auto correlation function for testing the presence of low frequency halftones is applied to obtain results for shift positions 4, 5, 6, 7, 8, 9 and 10. In addition, the previously mentioned flag, D/P, is generated in this module for use in both high and low frequency auto correlation modules as well as the peak count storage module.

The values for each of the shift positions derived by auto correlation of the min/max function are directed to high frequency halftone detector 128. Auto correlation values of adjacent shift positions are summed and compared to a programmable threshold. If any one of the sums is greater than or equal to this threshold and if there were both a minimum and maximum found within the auto correlation block, then a flag indicating high frequency halftones is set, indicating the presence thereof. If all the auto correlation values are equal to zero then the micro detection flag is reset to zero. Low frequency halftone detector 130 operates similarly.

Where the auto correlation function may fail to indicate the presence of high frequency halftones, the peak count from the peak counter and storage 132 is used. The peak count value represents the number of peaks in a given block of auto correlated pixels, accumulated over a fixed number of scan lines. This value is compared with two thresholds with typical values of 14 and 5. If the peak count value is greater than or equal to the higher threshold then the detection flag, for high frequency halftones, is set. If the peak count value is between the two thresholds then the flag for low frequency halftones is set.

Where the microdetection method described only establishes discrete spans of detected halftones, and detects only halftones where the peak or valley of a halftone dot exists, these spans now need to be connected together into a continuous region or area of halftones. This is a function of the macrodetector 44. The detected status of the block of auto correlated pixels, directed from the halftone micro detectors 128 and 130 to the halftone macro detector 134 is used to modify a set of counters in a memory, to establish a detection history. The number of previously microdetected halftones varies a weighting factor that is applied to the current detection of halftone. Detections of high frequency halftone and low frequency halftones are counted from the detection signals directed to halftone macrodetector 134 from halftone micro detectors 128 and 130. In the particular embodiment, the neighborhood of consideration is defined as the previous two blocks in the scanline currently processed, the block directly above the current block in the previous scanline and the two blocks to the right of the current block in the previous scanline. A combination of the detection results from the microdetection, the value of the block directly above the current block in the prior scanline, and the values of neighboring blocks determine the outcome of the macro detection level. In some the cases where the microdetection fails to indicate halftones due perhaps to extremes in halftone density range of the image, neighborhood information is used to determine the outcome of the macro detection level. This logic allows spanning of an area within a halftone pictorial that was not detected on the micro level. A high output flag, mac-hi-hft (for high frequency halftone areas) or mac-low-hft (for low frequency halftones), is generated so long as the region should be classified as either a high or low frequency halftone based on the context of microdetections. If a block of pixel is detected as high frequency halftone by the high frequency halftone detection block 128 for the first time as indicated by a zero history counter, the history counter is set to a high value, typically 32 for 400 scanlines per inch. The macro detection flag, mac-hi-hft, is set, only if one of the immediate neighboring blocks has a non-zero history count. This prevents an isolated false micro detection from being flagged as a macro detection. If the history counter of the current micro detected block is non zero, the mac-hi-hft flag is set. The counter is reset back to 32, if it is greater than 16 and set to 16 otherwise.

If the current block is not detected as high frequency halftone, yet its history counter is non-zero, indicating detection in the same block position of the previous scanlines, the adjacent blocks are then checked. If either of them also has non-zero count, the mac-hi-hft flag is set. This tends to fill up the block of undetected halftone inside those already detected. The history counter of the block is decreased by one so that unless further micro detection occurs in the same block in the subsequent scanlines, the block will not be classified as halftone after several scanlines. If the history counter of the undetected block is zero, the mac-hi-hft flag will not be set unless the previous two blocks or the next two blocks have non-zero history count.

The macro detection for the low frequency halftone is the same as the high frequency halftone with a different set of history counters. The macro detection process has the effect of merging the discrete micro detected blocks of pixel into the continuous region of the macro detected region. The extra macro detected region on both sides and below the actual halftone area can be re-classified in the final classification block 138.

For pixels in blocks not classified as halftones by the halftone micro detection, additional steps of classification into continuous tone or text/line art at block 138 are necessary. Background areas, identified as document background determination 140 are treated as belonging to text/line art, because the background and embedded text are best reproduced by simple thresholding. Text areas are characterized by pixels of low video levels corresponding to the black text and high video levels corresponding to the white background, connected by gray pixels that have high value of Laplacian sum at the edge of the text. In contrast to text, gray pixels inside a continuous tone picture, with the exception of textured area and high contrast edges, usually have a low value of Laplacian sum. The classification of text/line art versus continuous tone pixels thus could be done pixel by pixel, based on pixel $V_{i,j}$ as well as the absolute Laplacian sum which is already computed for each pixel. In order to avoid classifying a dark area, a highly textured area or a high contrast edge inside a continuous tone picture as text, image run discriminator 136 is provided. An image run is defined as a continuous sequence of non-background pixels that have either small Laplacian sums, or are inside either a high frequency halftone block or an image run determined from the previous scanline. These image runs are represented by the beginning and ending pixel indices and are stored in appropriate memory.

The present invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

What is claimed is:

1. A method of printing an image based on digital data on a substrate, comprising the steps of:
   identifying from the digital data a subset of the digital data relating to a portion of the image wherein pixels associated with the digital data are of a predetermined spatial relationship with pixels intended to be of a different color as the pixels associated with the digital data, wherein the identifying step includes the steps of
   forming a first data stream comprising image data for pixels intended to be printed in a first preselected color, and a second data stream comprising image data for pixels intended to be printed in a second preselected color different from the first preselected color;
   polling data corresponding to proximal locations in the image based on the digital data in the first data stream and the second data stream; and
   identifying data in the first data stream as the subset of digital data when image data for pixels intended to be printed in the first preselected color on the first data stream are present with image data for pixels intended to be printed in the second preselected color on the second data stream;
   causing the subset of digital data to activate a printhead adapted to emit ink of a first type; and
   causing digital data not in the subset to activate a printhead adapted to emit ink of a second type, the ink of the first type being adapted to dry at a faster rate than the ink of the second type.

2. The method of claim 1, wherein the identifying step includes the step of identifying from the digital data a subset of the digital data relating to a halftone pattern.

3. The method of claim 1, wherein the identifying step includes the steps of
   loading a quantity of digital data into a buffer;
   identifying from the quantity of digital data a datum of interest; and
   polling a set of digital data within the buffer which are of the predetermined spatial relationship with the datum of interest in the desired image.

4. The method of claim 3, wherein the identifying step further includes the step of loading into the buffer digital data indicative of pixels intended to be of a different color as the pixels associated with the digital data.

5. The method of claim 1, further including the steps of
   auto correlating data in the first data stream to detect a halftone pattern; and
   identifying data in the first data stream as the subset of digital data when image data for a halftone pattern is present with image data for pixels intended to be printed in the second preselected color on the second data stream.

6. A method of printing an image based on digital data on a substrate, comprising the steps of:
   identifying from the digital data a subset of the digital data relating to a portion of the image wherein pixels associated with the digital data are of a predetermined spatial relationship with pixels intended to be of a different color as the pixels associated with the digital data, wherein the identifying step includes the step of identifying from the digital data a subset of the digital data relating to a halftone pattern, and wherein the step of identifying from the digital data a subset of the digital data relating to a halftone pattern includes the steps of
   comparing, for each pixel in the image, said pixel to each of neighboring pixels to determine whether it is a local area minimum or maximum;
   deriving, from said determination step, two image signals, a first image signal representing local area maximums of the image, and a second image signal representing local area minimums of the image;
   measuring image density over a block of pixels with respect to a reference value;
   auto correlating the first image signal if measured image density is relatively high with respect to the reference, or auto correlating the second image signal if measured image density is relatively low with respect to the reference value;
   evaluating the auto correlation over the block of pixels for each of a plurality of offset values selected as corresponding to probable halftone frequencies;
   determining, from the auto correlated signal, for each offset value whether the result of the auto correlation evaluation is a zero or non-zero value, the presence of a non-zero value indicating the presence of halftone images at the frequency corresponding to the offset value; and
   identifying the pixels being associated with the halftone images at the frequency corresponding to the offset value as belonging to the subset of digital data;

causing the subset of digital data to activate a printhead adapted to emit ink of a first type; and causing non-subset digital data to activate a printhead adapted to emit ink of a second type, the ink of the first type being adapted to dry at a faster rate than the ink of the second type.

7. The method of claim 6 comprising the step of representing by a one bit per pixel function a first image signal representing local area maximums of the image, and a second image signal representing local area minimums of the image.

8. The method of claim 6, comprising the step of determining a local area minimum when a pixel is less than other pixels in the local area by a preselected amount.

9. The method of claim 6, comprising the step of determining a local area maximum when a pixel is greater than other pixels in the local area by a preselected amount.

10. The method of claim 6, wherein the comparing step includes comparing the pixel to the closest eight neighboring pixels.

11. The method of claim 6 wherein the determination of image density over the block of pixels comprises the step of maintaining a running average of pixel values in the block, and for each pixel determining whether the running average is greater than or less than a density reference.

* * * * *